(12) United States Patent
Ivey et al.

(10) Patent No.: US 12,206,759 B1
(45) Date of Patent: Jan. 21, 2025

(54) SYSTEM AND METHOD OF DIGITAL STEGANOGRAPHY

(71) Applicant: Systems & Technology Research, LLC, Woburn, MA (US)

(72) Inventors: Richard Ivey, Londonderry, NH (US); Piyush Kumar, Framingham, MA (US)

(73) Assignee: SYSTEMS & TECHNOLOGY RESEARCH, LLC, Woburn, MA (US)

( * ) Notice: Subject to any disclaimer, the term of this patent is extended or adjusted under 35 U.S.C. 154(b) by 358 days.

(21) Appl. No.: 17/546,693

(22) Filed: Dec. 9, 2021

Related U.S. Application Data

(60) Provisional application No. 63/129,195, filed on Dec. 22, 2020.

(51) Int. Cl.
    *H04L 9/06*     (2006.01)
    *H03M 13/05*     (2006.01)
    (Continued)

(52) U.S. Cl.
    CPC .......... *H04L 9/0631* (2013.01); *H03M 13/05* (2013.01); *H04L 51/063* (2013.01); *H04L 51/10* (2013.01); *H04L 51/52* (2022.05); *H04N 1/32272* (2013.01); *H04L 2209/16* (2013.01); *H04L 2209/34* (2013.01)

(58) Field of Classification Search
CPC ... H04L 9/0631; H04L 51/52; H04N 1/32272; H03M 13/05
See application file for complete search history.

(56) References Cited

U.S. PATENT DOCUMENTS

| 5,128,776 A * | 7/1992 | Scorse | H04N 19/60 |
| | | | 375/E7.091 |
| 7,240,209 B2 * | 7/2007 | Carro | G06F 40/163 |
| | | | 713/180 |

(Continued)

OTHER PUBLICATIONS

Hayes, Jamie, and George Danezis. "Generating steganographic images via adversarial training." Advances in neural information processing systems 30 (2017) (Year: 2017).*

(Continued)

*Primary Examiner* — Syed A Zaidi
(74) *Attorney, Agent, or Firm* — KRIEGSMAN & KRIEGSMAN

(57) ABSTRACT

A digital steganography system comprises a message sender in electronic communication with a message receiver through a social media platform. The message sender uses a compute device configured to conceal a secret digital message in the semantic components of a digitally synthesized image which is uploaded onto the social media platform and published in a social media post. As part of the message encoding process, the compute device for the message sender coverts the digital message into binary code, applies encryption and error-correction algorithms, and then implements image synthetization operations to yield the digitally synthesized image. The message receiver is provided with a compute device configured to identify the social media post, automatically download the synthesized image, and apply an inverse set of the image synthetization operations to yield binary code which is subsequently decoded and decrypted in order to extract the original covert message.

7 Claims, 5 Drawing Sheets

(51) Int. Cl.
  *H04L 51/063* (2022.01)
  *H04L 51/10* (2022.01)
  *H04L 51/52* (2022.01)
  *H04N 1/32* (2006.01)

(56) References Cited

U.S. PATENT DOCUMENTS

| | | | | |
|---|---|---|---|---|
| 8,872,981 | B1* | 10/2014 | Gish | H04N 19/30 |
| | | | | 345/590 |
| 11,057,192 | B2* | 7/2021 | Zheng | G06T 1/0028 |
| 2003/0016842 | A1* | 1/2003 | Patton | G06F 21/10 |
| | | | | 705/51 |
| 2011/0282697 | A1* | 11/2011 | Fitzgerald | H04W 12/126 |
| | | | | 705/4 |
| 2012/0311623 | A1* | 12/2012 | Davis | H04N 5/765 |
| | | | | 725/18 |
| 2013/0091564 | A1* | 4/2013 | Fitzgerald | G06F 21/88 |
| | | | | 726/17 |
| 2014/0200929 | A1* | 7/2014 | Fitzgerald | H04W 12/126 |
| | | | | 705/4 |
| 2019/0356476 | A1* | 11/2019 | Zheng | H04K 1/02 |

OTHER PUBLICATIONS

Zhang Z, Fu G, Ni R, Liu J, Yang X. A generative method for steganography by cover synthesis with auxiliary semantics. Tsinghua Science and Technology. Jan. 13, 2020;25(4):516-27 (Year: 2020).*
Duan X, Liu N, Gou M, Wang W, Qin C. SteganoCNN: Image steganography with generalization ability based on convolutional neural network. Entropy. Oct. 8, 2020;22(10):1140 (Year: 2020).*
NPL Search Terms (Year: 2024).*

* cited by examiner

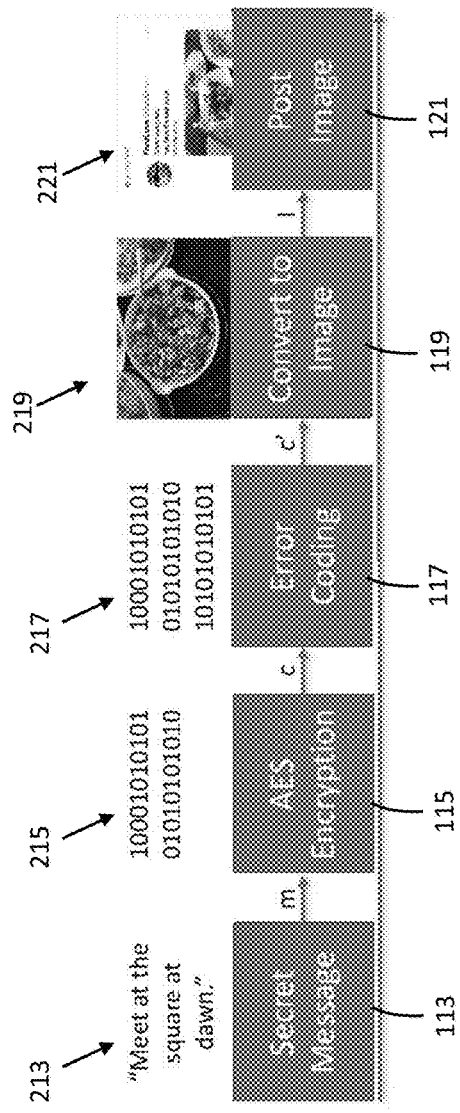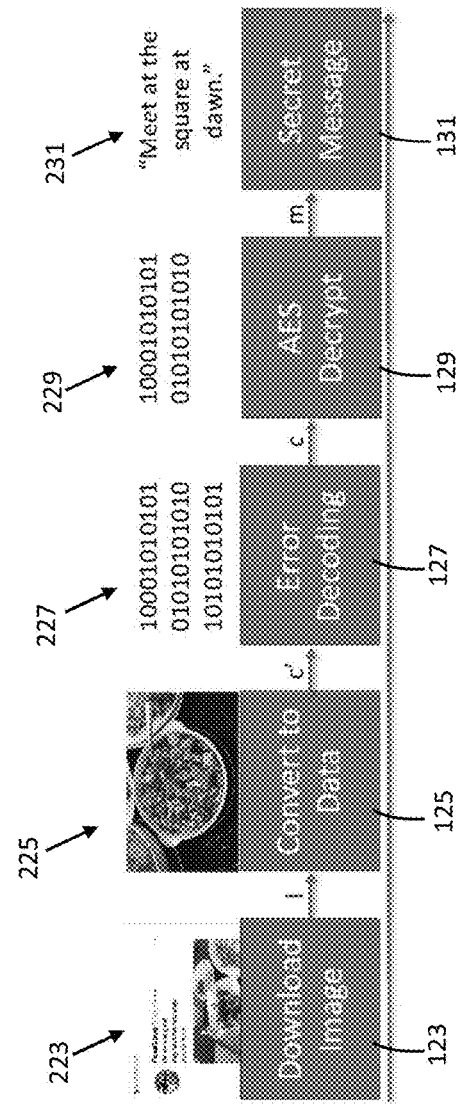

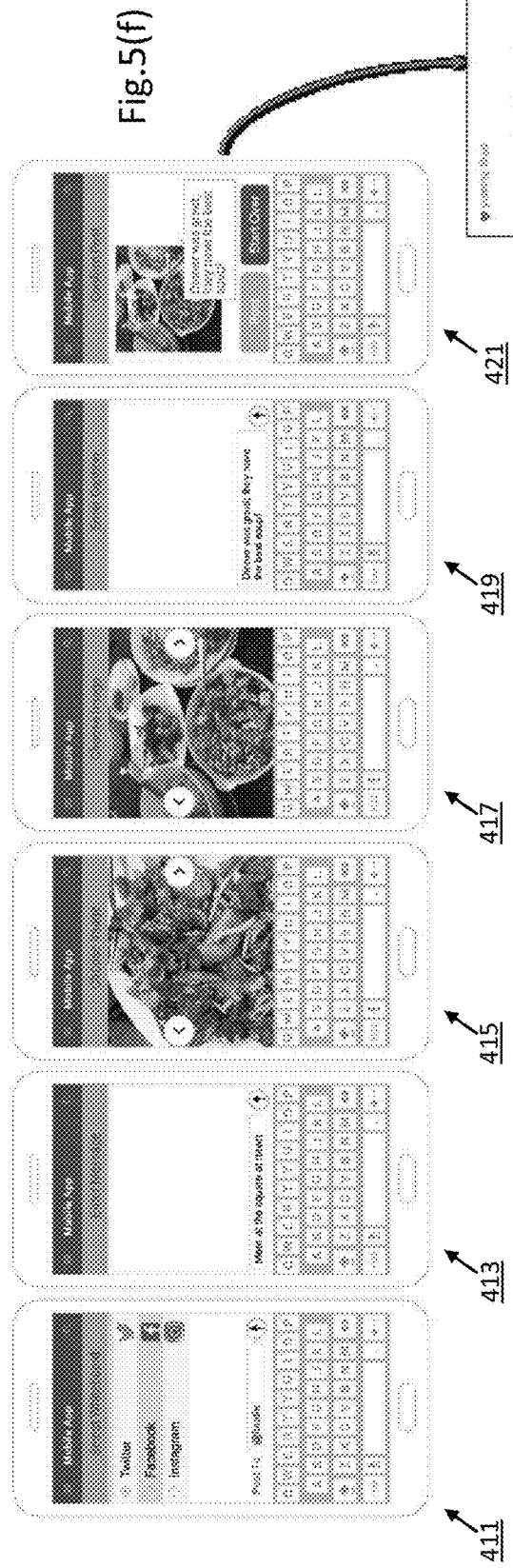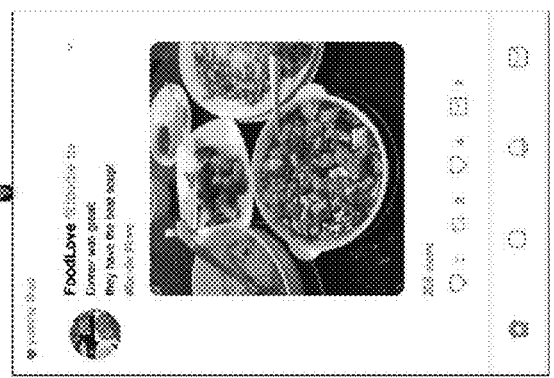
Fig. 5(a) 411
Fig. 5(b) 413
Fig. 5(c) 415
Fig. 5(d) 417
Fig. 5(e) 419
Fig. 5(f) 421
Fig. 5(g) 423

SYSTEM AND METHOD OF DIGITAL STEGANOGRAPHY

CROSS-REFERENCE TO RELATED APPLICATIONS

The present application claims the benefit under 35 U.S.C. 119 (e) to U.S. Provisional Patent Application No. 63/129,195, which was filed on Dec. 22, 2020 in the names of Richard Ivey et al., the disclosure of which is incorporated herein by reference.

FEDERALLY SPONSORED RESEARCH OR DEVELOPMENT

This invention was made with government support under contract number FA8750-19-C-0078 awarded by the Defense Advanced Research Projects Agency (DARPA)-Air Force Research Laboratory (AFRL). The government has certain rights in the invention.

FIELD OF THE INVENTION

The present invention relates generally to the field of covert communications and, more particularly, to systems and methods of digital steganography.

BACKGROUND OF THE INVENTION

In digital steganography, sensitive data, such as a secret message or other information, is concealed within an ordinary, non-secret, digital file, or cover media, such as an image, video, or text file. By embedding sensitive information within innocuous cover media that would not otherwise arouse interest as a source of covert communications, sensitive messages are more effectively transmitted without detection.

Various techniques are typically utilized to hide a covert message within cover media through digital steganography. Most commonly, secret text-based messages are hidden either (i) in the transport layer of the cover media (e.g., within file headers or compression coefficients of the digital media that are ordinarily utilized to define the functional and procedural rules for data transfer) or (ii) semantically irrelevant aspects of the media contents (e.g., least significant bits of data).

Traditional techniques of digital steganography of the type as described above have been found to suffer from a few notable drawbacks.

As a first drawback, traditional techniques of data obfuscation through digital steganography are relatively unsecure and unreliable. More specifically, it has been found that concealed messages are generally detectable using either straightforward file inspection or through entropy-based detection of data anomalies.

As a second drawback, traditional techniques of data obfuscation through digital steganography are relatively brittle, as the level of concealment of the hidden message can be significantly compromised through subtle manipulations of the cover media.

As a third drawback, traditional techniques of data obfuscation through digital steganography typically rely on a defined concealment mechanism that is unmodifiable. As a result, once the concealment mechanism has been identified, it can be subsequently utilized as a signature, or key, to identify subsequent messages which have been concealed using the same technique.

SUMMARY OF THE INVENTION

In view thereof, it is an object of the present invention to provide a novel system and method of digital steganography for obfuscating a covert message within digital cover media.

It is another object of the present invention to provide a system and method of digital steganography of the type as described above that is relatively secure and reliable.

It is yet another object of the present invention to provide a system and method of digital steganography of the type as described above wherein the covert message remains protected from manipulation of non-semantic data in the digital cover media.

It is still another object of the present invention to provide a system and method of digital steganography of the type as described above which utilizes a unique obfuscation technique for hiding each covert message within digital cover media.

It is yet still another object of the present invention to provide a system and method of digital steganography of the type as described above which utilizes an obfuscation technique for hiding a covert message within digital cover media that is invertible.

It is another object of the present invention to provide a system and method of digital steganography of the type as described above which is easy to configure and inexpensive to implement.

Accordingly, as one feature of the present invention, there is provided a method of digital steganography, comprising the steps of (a) constructing a digital message using a compute device, and (b) synthesizing a digital image from the digital message using the compute device, the digital image having semantic components, (c) wherein, as part of the synthetization step, the digital message is directly embedded into the semantic components of the synthesized digital image using an image synthetization operation.

As another feature of the present invention, there is provided a system of digital steganography, comprising (a) a sending party, the sending party having a compute device on which a digital message is constructed, and (b) a receiving party, the receiving party having a compute device, (c) wherein the compute device for the sending party is configured to synthesize a digital image from the digital message using an image synthetization operation, the digital image having semantic components into which the digital message is directly embedded.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings, wherein like reference numerals represent like parts:

FIGS. 3(a) and 3(b) illustrate a step-by-step example of the encoding and decoding stages, respectively, of a covert message transmitted using the method of FIG. 2;

FIGS. 5(a)-(g) depict a series of sample screen displays for another standalone software application which is configured to facilitate implementation of the digital steganography method of FIG. 2.

DETAILED DESCRIPTION OF THE INVENTION

Digital Steganography System 11

Figure 1:
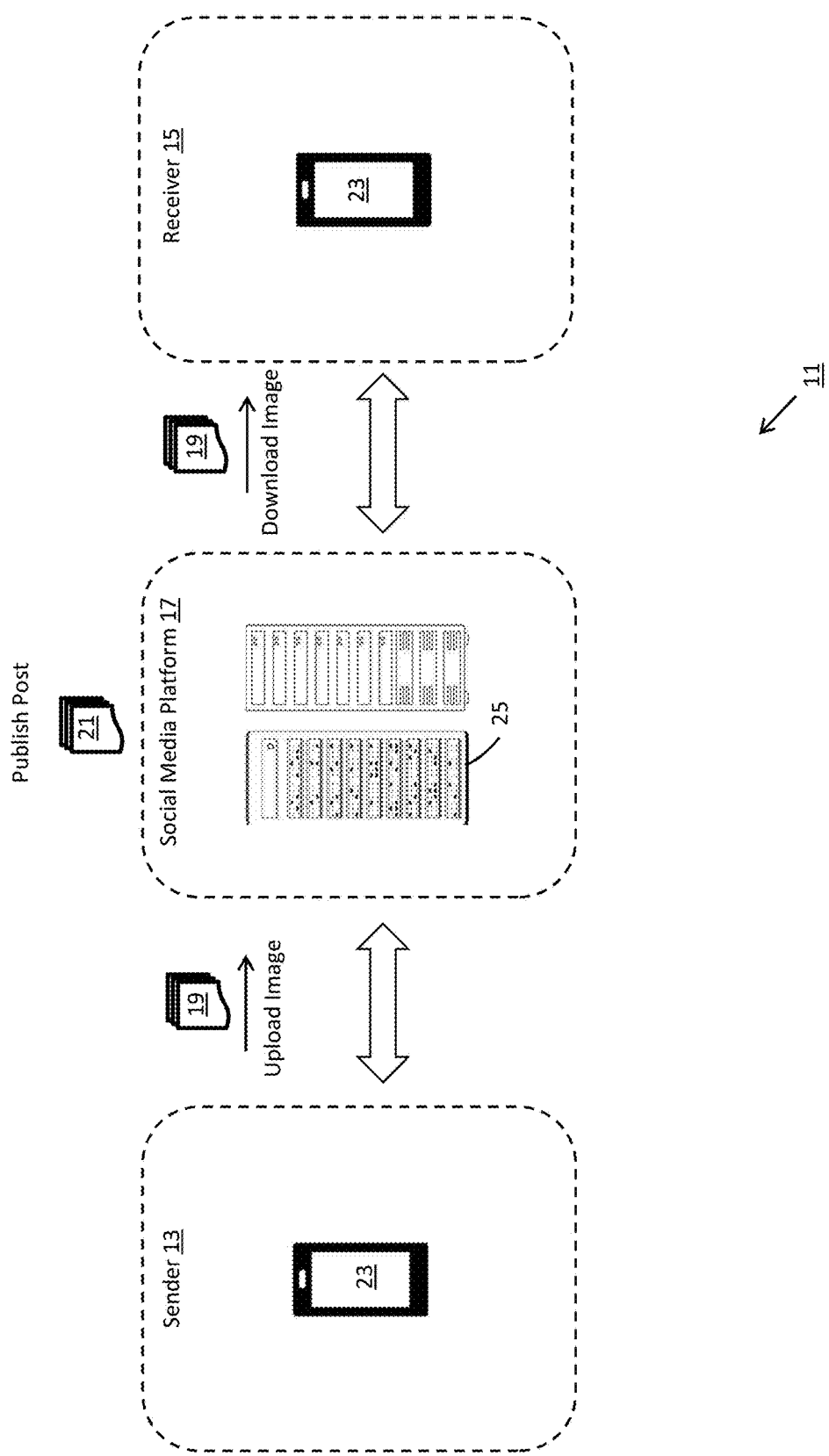
FIG. 1 is a simplified schematic representation of a digital steganography system constructed according to the teachings of the present invention.

Referring now to FIG. 1, there is shown a simplified schematic representation of a digital steganography system constructed according to the teachings of the present invention, the system being identified generally by reference numeral 11. As will be explained in detail below, system 11 applies a novel semantic-based approach to digital steganography by concealing hidden messages directly in the content of synthesized cover media. As a result, system 11 is uniquely designed to securely transmit covert messages, for instance, as public posts through traditional social media platforms.

In the description that follows, system 11 is described applying a data obfuscation solution through social steganography, wherein a sensitive message is embedded within a digital file, such as an image or video, which is publicly shared through traditional social media platforms. In this manner, a covert communication can be securely hidden within a meme or other popular culture reference that is widely viewed by the general public.

However, it should be noted that the present invention is not limited to a social steganography application. Rather, it is to be understood that the principles of the present invention could be similarly applied to transmit covert messages through other electronic communication channels, such as point-to-point connections (e.g., Secure File Transfer Protocol (SFTP) networks), online communication services (e.g., email), and the like.

As can be seen, system 11 comprises at least one message sender, or sending party, 13 in electronic communication with at least one message receiver, or receiving party, 15 through a social media platform 17. As will be described further below, sender 13 is able to conceal a secret digital message in the semantic components of digitally synthesized cover media 19 which is, in turn, uploaded onto social media platform 17 and published as part of a social media post 21. Upon identifying social media post 21, receiver 15 is able to download cover media 19 from post 21 and extract the hidden message embedded therein. In this capacity, a covert communication can be securely hidden within an overt social media post that otherwise appears innocuous, thereby minimizing the risk of arousing suspicion as an item of interest to third parties.

Sender 13 utilizes a compute device 23 to (i) construct, encrypt, and encode a covert digital message, (ii) embed the message directly into the semantics of a synthesized digital image, and (iii) upload the synthesized image onto social media platform 17 as part of social media post 21. As can be appreciated, compute device 23 represents any web-enabled compute device, such as a smartphone, desktop computer, or laptop computer, which is able to electronically communicate with social media platform 17 through a designated website or software application.

For simplicity and ease of illustration, system 11 is shown comprising a single sender 13. However, it is to be understood that system 11 is inherently scalable. As a result, system 11 is designed to support a multitude of different senders 13 (i.e., to expand the scope of covert communications) as long as each sender 13 is equipped with a compute device 23 that is configured with the appropriate software to create and prepare a digital message, embed the message within a synthesized digital file, and upload the synthesized digital file onto social media platform 17.

In a similar fashion, receiving party 15 utilizes a compute device 23 to (i) electronically monitor social media platform 17 for a selection of posts 21 of potential interest, (ii) extract and download each synthesized image 19 from the selection social media posts 21, (iii) convert synthesized image 19 back to binary code, and (iv) decode and decrypt the binary code to obtain the covert digital message. As previously referenced, compute device 23 represents any web-enabled compute device, such as a smartphone, desktop computer, or laptop computer, which is able to electronically communicate with social media platform 17 through a designated website or software application.

For simplicity and ease of illustration, system 11 is shown comprising a single receiving party 15. However, it is to be understood that system 11 is inherently scalable. As a result, system 11 is designed to support a multitude of different receivers 15 (i.e., to expand the scope of covert communications) as long as each receiving party 15 is equipped with a compute device 23 that is configured with the appropriate software to monitor social media platform 17, download identified image files, convert the identified image file into a string, or code, of binary data, and apply the necessary algorithms to the binary code in order to extract the hidden message.

Social media platform 17 represents any known online social media service that routinely publishes digital images and other related content through electronic posts which are rendered available to a sender-specified selection of its subscribers. In the present embodiment, social media platform 17 is shown comprising a central controller, or web server, 25 for regulating the principal operations of its content sharing operations.

It should be noted that system 11 is not limited to a single social media platform as the sole communication medium for transmitting covert messages between senders 13 and receivers 15. Rather, it is to be understood that system 11 could be configured to support multiple social media platforms 17 to facilitate communications amongst sending parties 13 and receiving parties 15.

Additionally, as referenced above, system 11 is not limited to a social steganography application. Rather, it is to be understood that the principles of the present invention could be similarly applied to transmit covert messages through other electronic communication channels, such as any application-based or browser-based software application which enables multiple users to visually inspect shared digital content through an online whiteboard (i.e., a whiteboard service).

Digital Steganography Method 111

As referenced above, system 11 is uniquely designed to engage in a novel method of digital steganography, the method being identified generally herein with reference numeral 111. As will be explained in detail below, method 111 relies principally upon novel encryption, encoding and image synthetization steps that together embed an encrypted message directly into the semantics of a synthesized image through a fully invertible transformation process. As a result, transmission of the covert message is rendered not only highly secure but also fully decryptable by the intended receiving party.

Figure 2:
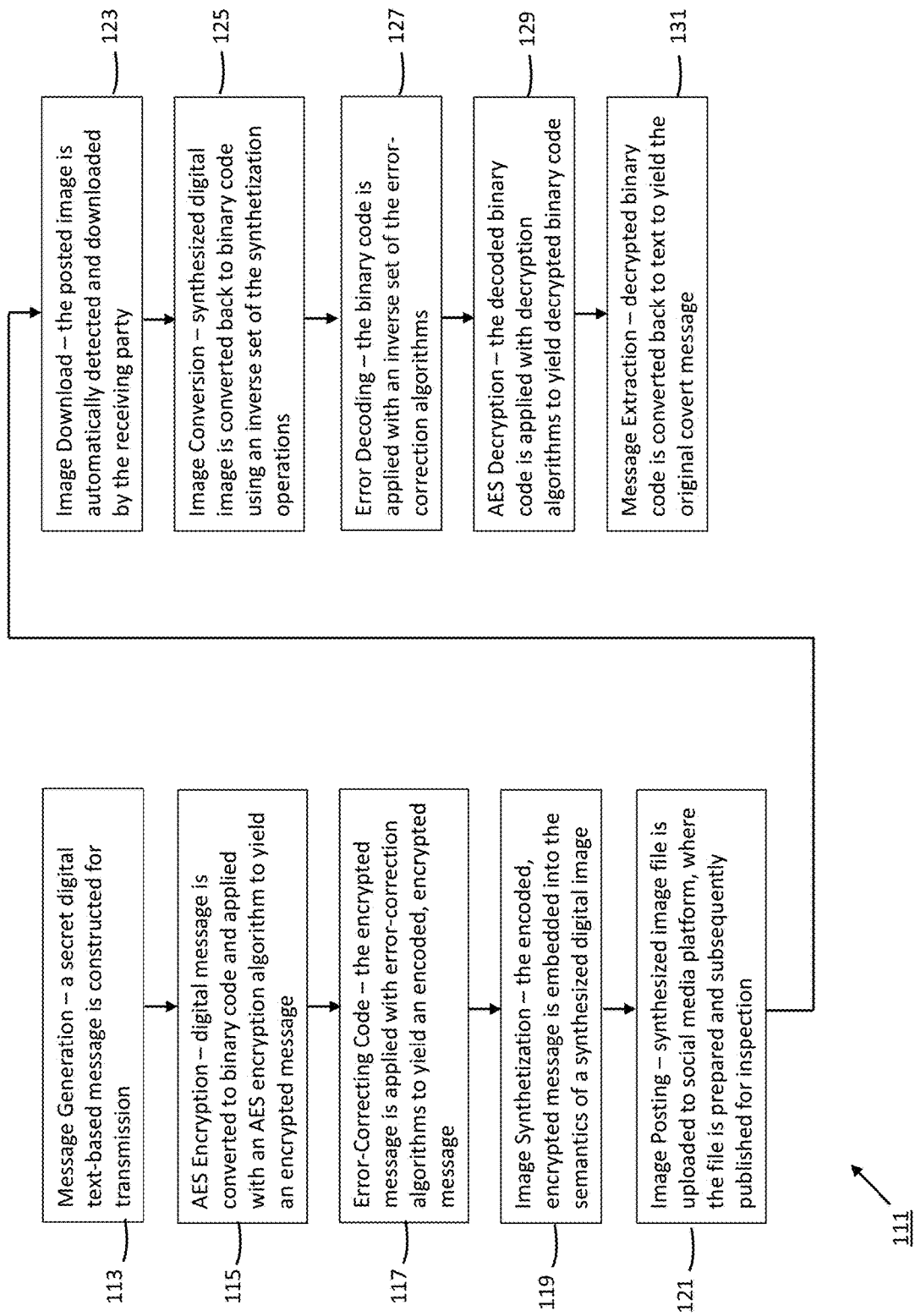
FIG. 2 is simplified flow diagram of a novel method of digital steganography implemented by the system shown in FIG. 1.

Referring now to FIG. 2, there is shown a simplified flow diagram of digital steganography method 111. To initiate method 111, a covert, or secret, text-based digital message is generated by sender 13 using compute device 23, this message generation step being identified generally by reference numeral 113. Preferably, compute device 23 for sender 13 utilizes a designated software application for message generation step 113 as well as subsequent data transformation steps. For illustrative purposes, sample software applications will be shown in further detail below.

Upon completion of step 113, compute device 23 (i) converts the digital message into a string, or code, of binary data and (ii) applies an advance encryption standard (AES) encryption algorithm to the binary code as part of encryption step 115. The encryption algorithm applied in step 115 utilizes a fully symmetric encryption key which may include, for instance, one or more fully invertible transformation functions that together convert the binary data (i.e., the secret message) into encrypted binary code, or cipher text.

The encrypted binary code, or cipher text, produced in step 115 is then applied with error coding algorithms as part of an error-correcting step 117. Specifically, applicant has recognized that media files typically shared on conventional social media platforms are applied with certain file processing operations which can compromise the ability to accurately retrieve a hidden message during subsequent decryption operations. Accordingly, step 117 applies novel forward error correction and message embedding transformation operations to the encrypted binary code produced in step 115 in order to prepare the data for the various file transforms applied by the designated social media platform 17 as part of the publishing process. In this manner, the message transformation process is ultimately rendered fully invertible with the resultant image capable of being decoded with great accuracy.

By incorporating novel forward error correction coding and message embedding techniques in step 117, method 111 achieves significant robustness to file transcoding and other content manipulation by social media platform 17, such as file compression, resizing, and the like. For instance, conventional social media platforms 17 typically compress images during publication from a 24-bit portable network graphics (PNG) image file format to an 8-bit PNG image file format. Additionally, conventional social media platforms 17 often resize image files from an image resolution, or pixel size, of 1024 pixels by 1024 pixels to a resolution of 256 pixels by 256 pixels.

In step 119, the encoded and encrypted binary data produced in step 117 is, in turn, applied with a series of operations which collectively embed the data directly into the semantic properties of a synthesized image (i.e., within the image contents). It is to be understood that the semantic components, or content, of a synthesized image pertains to the visual content of its features. In other words, a digital image is segmented into groups of individual pixels which are, in turn, applied with a definition, or label, relating to certain image features, such as color, gradient orientation, and the like. As can be appreciated, semantic image information is commonly retrieved from digital images using known deep learning algorithms (e.g., of the type used in facial recognition applications).

Preferably, conventional image synthesis techniques are utilized to produce a synthesized image from the binary data. For instance, the automated synthesis of a realistic image from a text string in binary code can be readily implemented using artificial intelligence (AI) and machine learning (ML) algorithms. For example, an invertible normalizing flow, or other similar invertible modeling process, can be utilized to synthesize random, realistic images as part of a text-to-image formulation process.

By concealing hidden messages directly into the semantics of the synthesized media (i.e., within its image contents), and not its transport layer, the resultant media has no detectable encryption signature. This inability to detect an encryption signature is achieved because the synthesized media is created from the same feature distribution learning algorithms as real images which are used to train the artificial intelligence during the synthesis process.

Preferably, deep learning algorithms utilized in step 119 as part of the vector-to-image transformation process are fully invertible (i.e., lossless). This invertibility of the transformation process is essential in order to enable receiving party 15 to accurately decode the secret message from the synthesized cover media.

Once the synthesized image has been generated in step 119, sender 13 uploads the synthesized image file from compute device 23 onto social media platform 17 as part of an image posting step 121. Prior to publication of the synthesized image as part of a designated post, social media platform 17 manipulates the image file with various standard file transforms, such as file transcoding, compression and resizing, which can compromise the invertibility of the resultant file.

However, as previously mentioned, method 111 compensates for these file transforms, which would otherwise prevent full invertibility, by preemptively applying error correction coding and embedding techniques to the image file prior to being uploaded onto the intended social media platform 17. In other words, because conventional social media platforms 17 automatically manipulate images with various file transforms prior to posting, step 117 applies specific error correction coding and embedding techniques to the image file to ensure that the resultant image is capable of being accurately decoded.

As a result of image posting step 121, the synthesized image, which is semantically embedded with the covert digital message, is available for inspection by a selection of subscribers to social media platform 17. Due to the innocuous nature of the social media post, the synthesized image is less likely to arouse interest as means of covert communications by a third party.

A software application on compute device 23 for receiving party 15 preferably monitors social media platform 17 for posts 23 of particular significance, such as posts rendered by certain individuals or posts with images of certain content. Upon detecting images of interest, compute device 23 for receiving party 15 is programmed to automatically download such images for further review, this image downloading step being represented by reference numeral 123.

Thereafter, as part of image conversion step 125, the synthesized digital image downloaded onto compute device 23 for receiving party 15 is converted back into binary code using an inverse set of the synthetization operations applied in image synthesis step 119. Because deep learning algorithms, such as convolutional neural networks (ConvNet), used in vector-to-image and image-to-vector transformation operations are fully invertible, the original binary data can be obtained in a lossless fashion.

The resultant string of binary data is then applied with an inverse set of the error-correction algorithms applied in step 117, this error decoding step being represented generally by reference numeral 127. Subsequently, as part of an AES decryption step 129, the decoded binary string is applied with an inverse set of the AES encryption algorithms applied in step 115.

The resultant binary code is then converted, or translated, back from binary code to text as part of a message extraction step 131. As can be appreciated, the translation of the binary code to text should yield the original covert message, thereby completing digital steganography process 111.

An illustrative example of the encoding and decoding stages of a covert message transmitted using method 111 is provided in FIGS. 3(a) and 3(b), respectively. As seen in message generation step 113 shown in FIG. 3(a), a secret, text-based message 213 is constructed using a designated software application loaded on sender compute device 23. As part of AES encryption step 115, message 213 is converted into binary code and applied with AES encryption algorithms to yield an encrypted string of binary code 215. Thereafter, in error coding step 117, encrypted binary code 215 is applied with error-correcting code to yield a string of binary code 217 that has been both encrypted and encoded. Notably, the error-correcting algorithms include both forward error correction (FEC) coding as well as message embedding algorithms.

As part of image synthesis step 119, binary code 217 is then applied with a series of deep learning, image synthetization operations which collectively embed binary code 17 directly into the semantic properties of a synthesized image 219. Preferably, multiple synthesized images 219 (e.g., of a human face, plate of food, or the like) are generated in step 119 so that sending party 13 can select the most appropriate cover media for the covert transmission. In step 121, sender selects and uploads the desired image file 219 into a social media post 221, which may include additional content, such as a description of the picture or complementary information (e.g., social media hashtags).

As shown in step 123 of FIG. 3(b), a receiving party 15 uses a compute device 23 to automatically monitor posts 223 on social media platform 17. Upon detecting a post 223 of interest, compute device 23 for receiving party 15 downloads an image 225 from post 223. As part of image conversion step 125, image 225 is then converted back into binary code for subsequent processing operations.

Thereafter, in error decoding step 127, the binary code is applied with an inverse set of the error-correction algorithms applied in step 117 to yield encoded binary code 227. Then, as part of AES decryption step 129, code 227 is applied with an inverse set of the AES encryption algorithms applied in step 115 to yield a string of binary code 229 which has been decrypted and decoded. Code 229 is then translated back into a text string 231 as part of message extraction step 131. As can be seen, text string 231 is identical to the original covert message 213 constructed back in primary step 113.

Standalone Software Application

Figure 4:
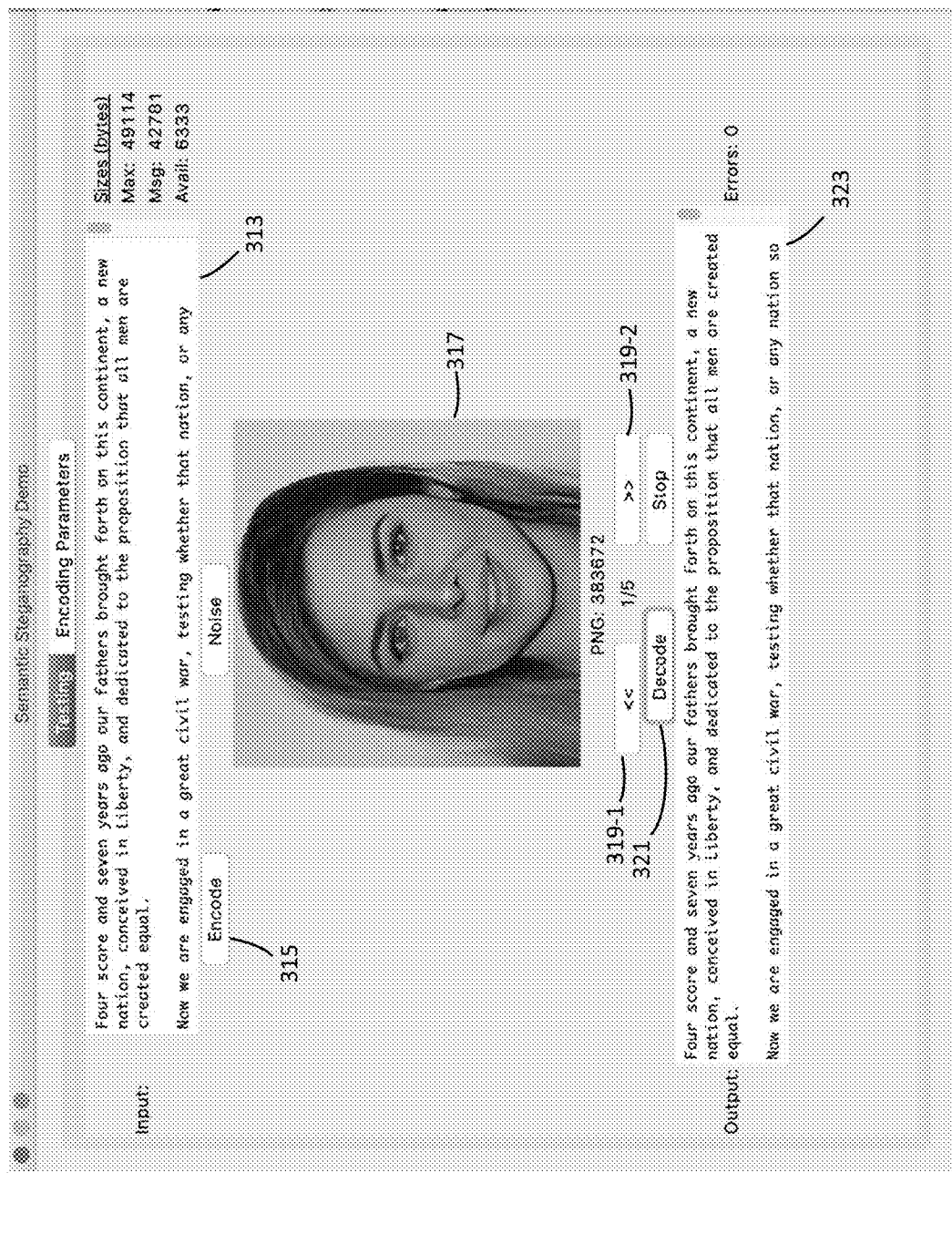
FIG. 4 is a sample screen display of the user interface for a standalone software application which is designed to facilitate the encoding and decoding operations of the digital steganography method of FIG. 2.

Preferably, each compute device 23 in system 11 is configured with a designated software application that facilitates execution of various steps of digital steganography process 111 in a user-intuitive fashion. For instance, referring now to FIG. 4, there is shown a sample screen display of a user interface for a standalone software application which is designed to facilitate the encoding and decoding operations of digital steganography process 111, the sample screen display being represented generally by reference numeral 311.

To facilitate the encoding operation of process 111, sample screen display 311 is provided with a text input window 313 into which a covert text message can be input. Upon clicking an encoding button 315, the software application engages in encryption, error coding, and synthetization steps 115, 117, and 119 to yield a synthesized image 317 for user inspection. Preferably, multiple images are generated upon clicking encode button 315, with the user able to scan through the different images 317 using next buttons 319-1 and 319-2. The selected image 317 can then be used to transmit the original covert message through the desired communication path (e.g., a designated social media whiteboard).

Similarly, to facilitate the decoding operation of process 111, sample screen display 311 is provided with a decode button 321, which is used to apply conversion, decoding, and decryption steps 125, 127, and 129 to the selected image 317. Upon clicking decode button 321, the software application applies the aforementioned operations to synthesized image 317 to extract the original covert message and, in turn, display the message within a text output window 323.

Referring now to FIGS. 5(a)-(g), there is shown a series of sample screen displays for another standalone software application which is configured to facilitate implementation of digital steganography method 111. In FIGS. 5(a)-(g), the software application is represented as a fully-productized service that executes all principal operations of digital steganography process 111, thereby greatly simplifying the user experience.

In FIG. 5(a), a sample screen display 411 is shown which preferably loads upon launching of the mobile application. As can be seen, display 411 enables the user to specify (i) the particular social media whiteboard onto which the secret message is to be posted as well as (ii) the subscriber account with which the post is to be associated.

Referring now to FIG. 5(b), upon selecting a particular social media service and associated user account, a subsequent screen display 413 is provided which enables the user (i.e., sender 13) to enter a covert message for transmission. Upon entering the text-based message, the software application automatically applies the encryption, error coding, and synthesizing steps of method 111 to yield a series of synthesized images, as represented in sample screen display 415 shown in FIG. 5(c). As can be seen, screen display 415 enables the user to intuitively scroll amongst a plurality of synthesized images, each image having the original covert message embedded within its semantic components (i.e., within its image contents).

In sample screen display 417 shown in FIG. 5(d), the user selects the synthesized image to be shared on the selected social media whiteboard. In response, a screen display 419 is provided which enables the user to enter an accompanying caption, such as a related comment and/or social media hashtag, as shown in FIG. 5(e).

In FIG. 5(f), a sample screen display 421 is provided which enables the user to review the post particulars and, if satisfied, transmit the data to the social media whiteboard for publication. In response, the picture and caption are published, or posted, on the social media whiteboard, as illustrated in screen display 423 shown in FIG. 5(g). Although not shown herein, a complementary set of screen displays is preferably provided by the software application that enables pictures posted across multiple social media whiteboards to be automatically downloaded and applied with a series of inverse operations to extract and display any hidden messages embedded in its semantic components.

The invention described in detail above is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A method of digital steganography, comprising the steps of:
    (a) constructing a digital message using a compute device;
    (b) converting the digital message into binary code; and
    (c) synthesizing a digital image from the digital message using the compute device, the digital image having semantic components;
    (d) wherein, as part of the synthetization step, the binary code is directly embedded into the semantic components of the synthesized digital image using a fully invertible image synthetization operation, the image synthetization operation including at least one artificial intelligence and machine learning algorithm for producing the synthesized image from binary code, wherein invertible normalizing flow modeling is utilized to produce the synthesized image from binary code.

2. The method as claimed in claim 1 further comprising the step of, after the conversion step and prior to the synthesizing step, digitally encrypting the binary code using the compute device to yield encrypted binary code.

3. The method as claimed in claim 2 wherein, in the encrypting step, the compute device applies an advance encryption standard (AES) encryption algorithm to the binary code to yield the encrypted binary code.

4. The method as claimed in claim 2 further comprising the step of, after the encrypting step and prior to the synthesizing step, applying error-correction algorithms to the encrypted binary code using the compute device.

5. The method as claimed in claim 4 wherein the error-correction algorithms include forward error correction algorithms and message embedding algorithms.

6. The method as claimed in claim 4 further comprising the step of, after the synthetization step, transmitting the synthesized image over a communication medium.

7. The method as claimed in claim 6 wherein, as part of the transmission step, the synthesized image is posted onto a social media platform.

* * * * *